United States Patent
Inagaki et al.

(10) Patent No.: US 9,377,875 B2
(45) Date of Patent: Jun. 28, 2016

(54) INFORMATION PROCESSING APPARATUS, CONTROL METHOD, AND RECORDING MEDIUM

(71) Applicant: CANON KABUSHIKI KAISHA, Tokyo (JP)

(72) Inventors: Kensuke Inagaki, Kawasaki (JP); Ryota Shoji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 13/727,730

(22) Filed: Dec. 27, 2012

(65) Prior Publication Data

US 2013/0176217 A1 Jul. 11, 2013

(30) Foreign Application Priority Data

Jan. 6, 2012 (JP) ................................. 2012-001583

(51) Int. Cl.
- *G06F 3/033* (2013.01)
- *G06F 3/14* (2006.01)
- *G09G 5/08* (2006.01)

(52) U.S. Cl.
CPC .............. *G06F 3/033* (2013.01); *G06F 3/1462* (2013.01); *G09G 5/08* (2013.01); *G09G 2340/02* (2013.01); *G09G 2370/16* (2013.01)

(58) Field of Classification Search
CPC ................... G06F 3/0481; G06F 2203/04808; G06F 3/0482; G06F 3/0488; G06F 3/04842; G06F 3/04812; G06F 3/04886; G06F 3/03547; G06F 3/0383; G06F 3/04817; G06F 2203/04803; G06F 3/041; G06F 3/0486; G06F 2203/0383; G06F 8/34; G09G 5/08; G09G 5/363

USPC ...................................................... 345/56–163
See application file for complete search history.

(56) References Cited

U.S. PATENT DOCUMENTS

| 6,191,807 | B1 * | 2/2001 | Hamada ................... H04N 7/15 348/14.03 |
| 2005/0160380 | A1 * | 7/2005 | Konar et al. ................... 715/858 |
| 2006/0015508 | A1 * | 1/2006 | Kondo et al. ................... 707/10 |

(Continued)

FOREIGN PATENT DOCUMENTS

| CN | 101067803 A | 11/2007 |
| CN | 102196224 A | 9/2011 |
| JP | 2005-257948 A | 9/2005 |

OTHER PUBLICATIONS

Chinese Office Action issued in corresponding application No. 201210591848.7 on May 18, 2015.

*Primary Examiner* — Amare Mengistu
*Assistant Examiner* — Gloryvid Figueroa-Gibson
(74) *Attorney, Agent, or Firm* — Carter, DeLuca, Farrell & Schmidt, LLP

(57) ABSTRACT

At least part of screen data corresponding to a screen displayed on the display unit of an information processing apparatus is transmitted to an image output apparatus. Transmission includes the first transmission mode in which at least part of screen data and pointer position information indicating the position of a pointer in the screen are transmitted without associating them, and the second transmission mode in which at least part of screen data and pointer position information are associated and transmitted. In a case that a predetermined operation using the pointer to an object included in the screen is detected, at least part of screen data is transmitted in the second transmission mode.

10 Claims, 11 Drawing Sheets

(56) References Cited

U.S. PATENT DOCUMENTS

| | | | | |
|---|---|---|---|---|
| 2006/0256084 A1* | 11/2006 | Hey | ............... | G06F 3/04812 345/157 |
| 2009/0153475 A1* | 6/2009 | Kerr | ............... | H04N 5/4403 345/157 |
| 2010/0045594 A1* | 2/2010 | Jenks | ............... | H04N 9/12 345/156 |
| 2011/0279365 A1* | 11/2011 | Monden | ............... | G06F 9/4445 345/157 |
| 2012/0169923 A1* | 7/2012 | Millar et al. | ............... | 348/399.1 |

* cited by examiner

F I G. 1
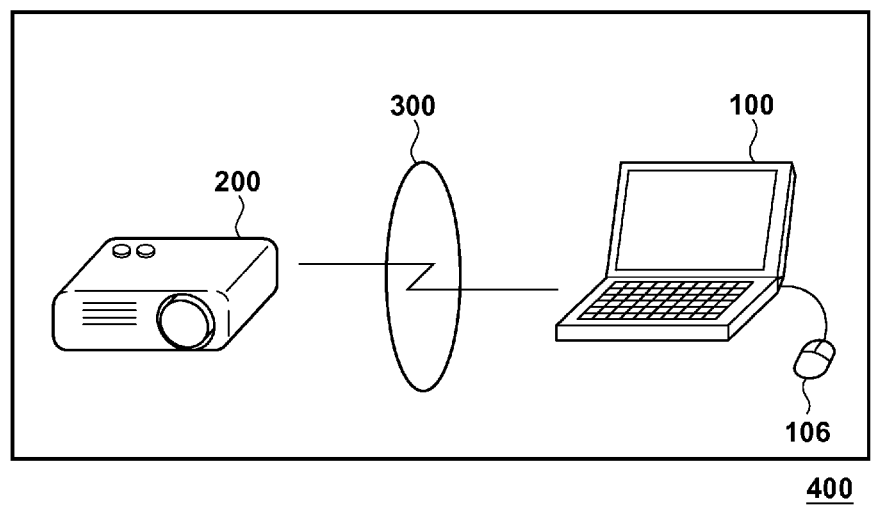

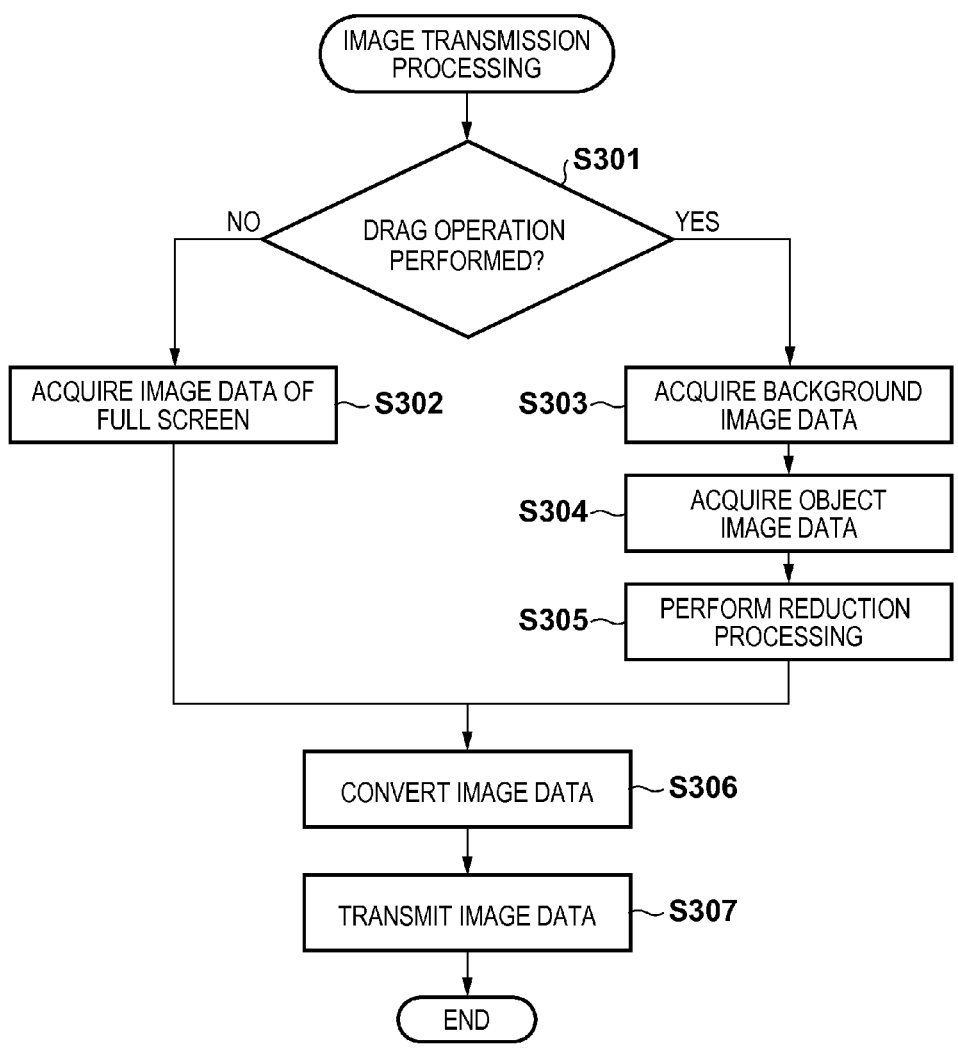

FIG. 9
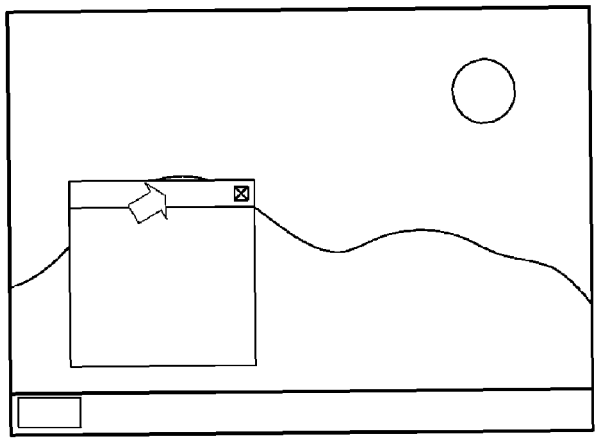
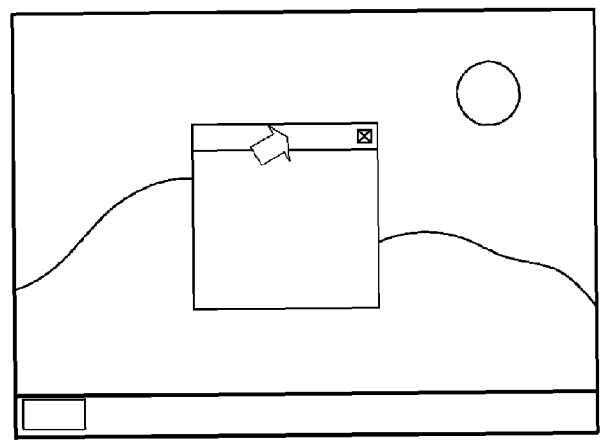
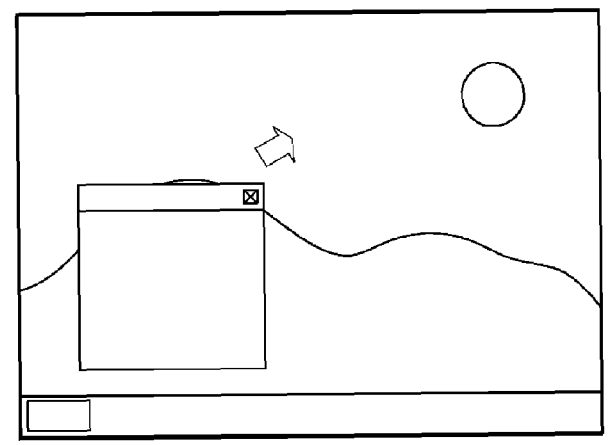

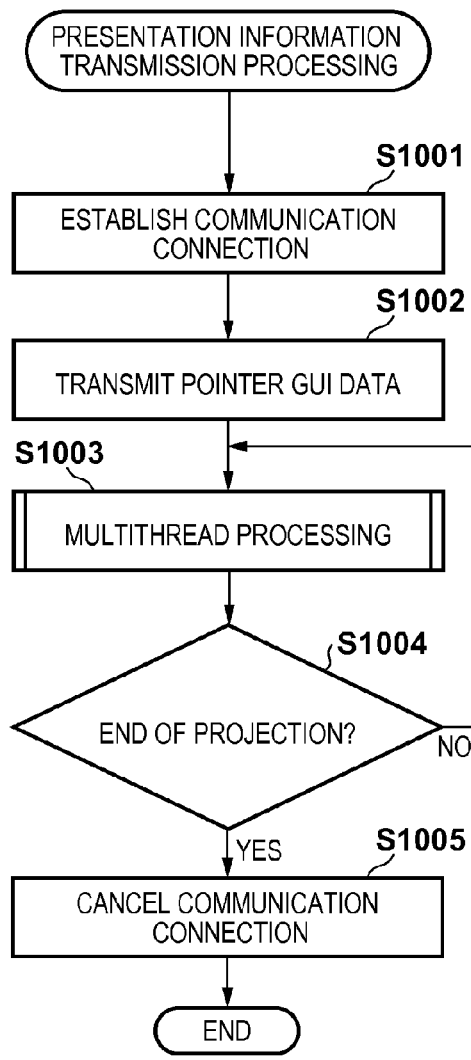
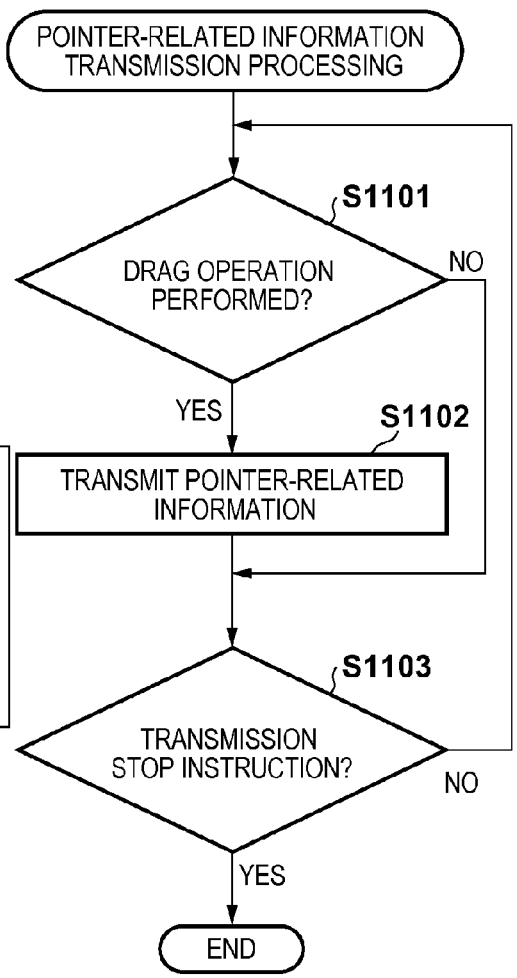
FIG. 10
FIG. 11

INFORMATION PROCESSING APPARATUS, CONTROL METHOD, AND RECORDING MEDIUM

BACKGROUND OF THE INVENTION

1. Field of the Invention

The present invention relates to a technique of sequentially transmitting images generated in an information processing apparatus at a predetermined interval and presenting them by an image output apparatus.

2. Description of the Related Art

Recent popularization of image output apparatuses such as a projector makes it possible to output image signals by connecting an information processing apparatus such as a PC to the projector, and present images generated by the PC to many people so that they can view the images in a presentation or the like. The connection between the PC and the projector generally uses analog connection via an analog RGB cable, and allows smooth continuous image presentation by outputting analog image signals generated by the PC in synchronism with clock signals, as needed.

However, the connection between the PC and the projector using the cable suffers the preparation of the cable, the labor of connection when the connection is switched between a plurality of PCs to use the project, and a problem in connection such as spatial limitation in the use of the PC. That is, image presentation using the projector has various restrictions imposed by the use of physical wiring.

To solve this, a projector capable of receiving an image without using physical wiring has recently been proposed. When presenting an image on a projector of this type, a PC transmits the image via a wireless communication means. For example, when presenting the image signal on the desktop of a PC as in a conventional way, the PC transmits image data obtained by periodically capturing the desktop (acquisition of desktop screen data from a video memory).

In image presentation performed by transmitting an image from the PC to the projector via the wireless communication means, presented successive images may contain the motion of an object such as movement of a pointer by a mouse operation. In this case, presented successive images may not appropriately express the motion depending on the frequency at which capturing is performed. Thus, upon detecting a motion, an image is captured and transmitted, so an image properly expressing the motion can be presented. In other words, when a motion is detected, the frequencies of capturing and transmission become higher than normal.

Recent projectors include an increasing number of pixels of projectable image data. The above-mentioned image presentation via the wireless communication means sometimes uses image data of many pixels. In the arrangement in which the image data transmission frequency rises upon detecting a motion, the transmission quantity per unit time increases. This may increase the traffic in the transmission channel. Increasing the traffic causes a transmission delay of image data to be presented, and a so-called frame drop in which images presented by the projector become discontinuous. As a result, presented successive images may not properly express the motion of an object or the like, impairing the operational feeling experienced by the user.

To solve this problem, for example, Japanese Patent Laid-Open No. 2005-257948 discloses a method of avoiding a transmission delay generated by frequent image updating when a pointer moves. For this purpose, only coordinate information is transmitted for the movement of the pointer, and an image output apparatus renders the pointer at corresponding coordinates.

The method in Japanese Patent Laid-Open No. 2005-257948 can achieve efficient image transmission upon updating a pointer position. However, when a partial object such as a window within the screen is updated, this method may not be able to efficiently transmit an image.

SUMMARY OF THE INVENTION

The present invention has been made to solve the conventional problems. The present invention provides a technique of reducing degradation in the operational feeling experienced by the user in transmission of an output image to an image output apparatus.

The present invention in its first aspect provides an information processing apparatus capable of communicating with an image output apparatus, comprising: an acquisition unit configured to acquire pointer position information indicating a position of a pointer in a screen displayed on a display unit of the information processing apparatus; a detection unit configured to detect an operation using the pointer to an object included in the screen; and a transmission control unit configured to control to transmit at least part of screen data corresponding to the screen to the image output apparatus, wherein modes of transmission by the transmission control unit includes a first transmission mode in which the at least part of the screen data and the pointer position information acquired by the acquisition unit are transmitted without association, and a second transmission mode in which the at least part of the screen data and the pointer position information acquired by the acquisition unit are associated and transmitted, and in a case that the detection unit detects a predetermined operation, the transmission control unit transmits the at least part of the screen data in the second transmission mode.

Further features of the present invention will become apparent from the following description of exemplary embodiments (with reference to the attached drawings).

BRIEF DESCRIPTION OF THE DRAWINGS

FIG. 1 is a view exemplifying an image transmission/presentation system according to an embodiment of the present invention;

FIG. 3 is a flowchart showing image transmission processing according to the first embodiment of the present invention;

FIG. 9 is a view for explaining a problem to be solved in the second embodiment of the present invention;

FIG. 10 is a flowchart showing presentation information transmission processing according to the second embodiment of the present invention;

FIG. 11 is a flowchart showing pointer-related information transmission processing according to the second embodiment of the present invention;

DESCRIPTION OF THE EMBODIMENTS

First Embodiment

A preferred embodiment of the present invention will now be described in detail with reference to the accompanying drawings. The embodiment set forth will explain an example of applying the present invention to a PC capable of wirelessly transmitting an image as an example of an information processing apparatus, and a projector capable of presenting a wirelessly received image as an example of an image output apparatus. However, the present invention is applicable to a system using arbitrary devices with an arrangement in which digital image data generated by an information processing apparatus is transmitted to an image output apparatus and the image output apparatus presents the received image data.

<Arrangement of Image Transmission/Presentation System 400>

FIG. 1 shows the arrangement of an image transmission/presentation system 400 according to the embodiment of the present invention. The image transmission/presentation system 400 includes a PC 100 which generates image data to be presented, and a projector 200 which presents image data generated and transmitted from the PC 100.

In the embodiment, transmission of image data between the PC 100 and the projector 200 is directly performed via a wireless network 300 using ad hoc communication or the like. However, the practice of the present invention is not limited to this. That is, the present invention is applicable to an image transmission/presentation system in which image data generated by an information processing apparatus is presented by transmitting it to an image output apparatus using a transmission channel in which a transmission delay may occur owing to the restriction on transmission quantity. The image data transmission channel is not limited to wireless connection.

Separately from image data, the PC 100 transmits coordinate information on the image data to be presented by the projector 200 for a pointer which moves in accordance with the operation of a mouse 106 serving as a pointing device. The projector 200 according to the embodiment presents image data obtained by superimposing the pointer on the received image data at a position corresponding to the pointer coordinate information.

(Functional Arrangements of PC 100 and Projector 200)

Figure 2:
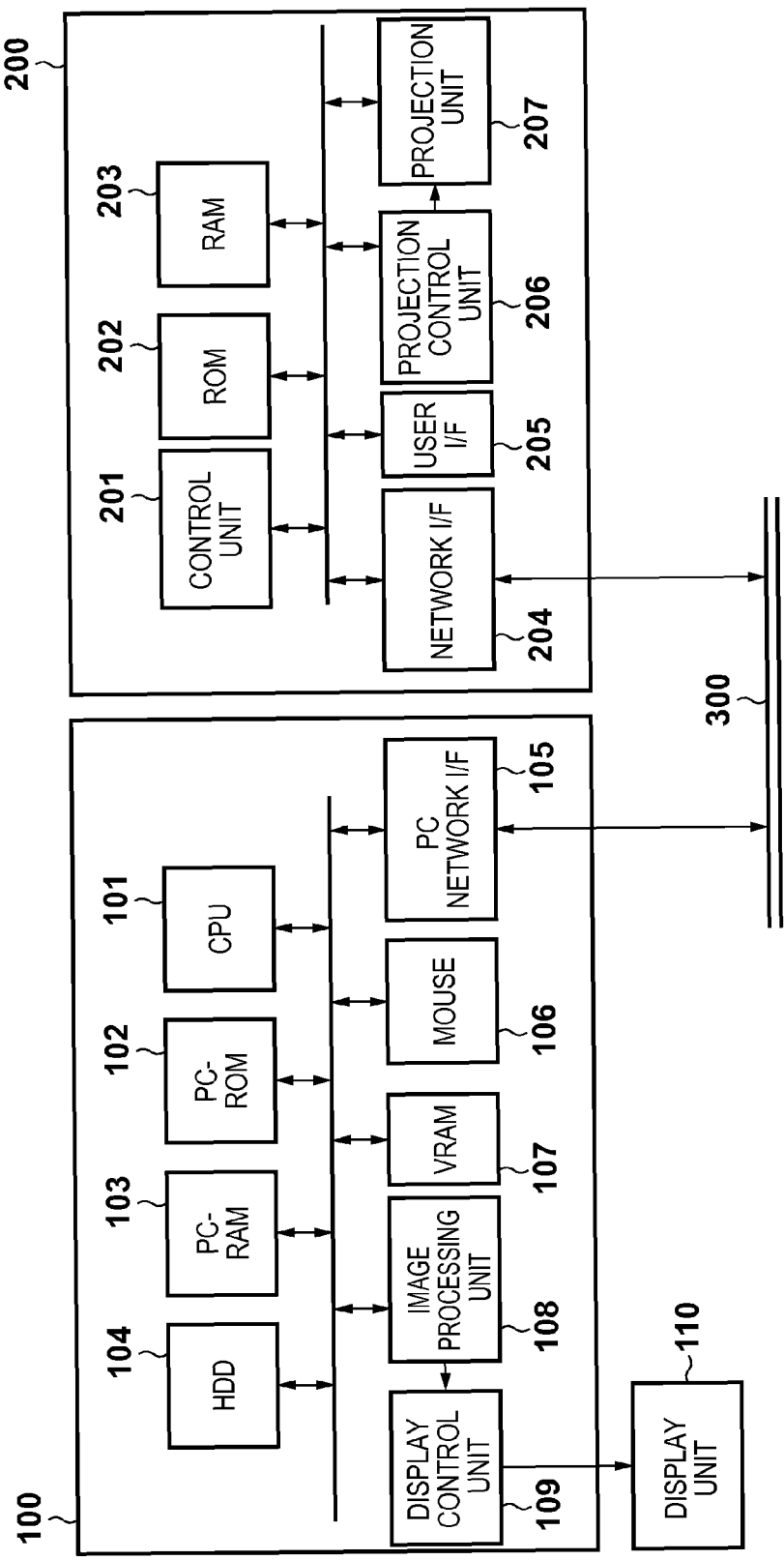
FIG. 2 is a block diagram showing the functional arrangements of a PC and projector according to the embodiment of the present invention.

FIG. 2 is a block diagram showing the functional arrangements of the PC 100 and projector 200 according to the embodiment of the present invention. The functional arrangement of the PC 100 will be explained first.

A CPU 101 is a block which controls the operation of each block in the PC 100. The CPU 101 controls the operation of each block in the PC 100 by, for example, reading out the program of image transmission processing (to be described later) stored in a PC-ROM 102 or HDD 104, expanding it in a PC-RAM 103, and executing it.

The PC-ROM 102 is, for example, a rewritable nonvolatile memory, and stores parameters necessary for the operation of each block of the PC 100, control programs describing the processing procedures of the CPU 101, and the like. The PC-RAM 103 is, for example, a volatile memory. The PC-RAM 103 is used as an expansion area for the program of image transmission processing, and also as a work memory in the operation of each block to temporarily store data and control programs output by the operation.

The HDD 104 is a recording medium detachably connected to the PC 100, and records data such as an operating system (OS) and applications. In the embodiment, an OS function acquires pointer coordinate information, and information about a running application and the window position and size of the application.

A PC network I/F 105 is a network interface for communicating with the projector 200 via the wireless network 300 which is, for example, a wireless LAN. In the embodiment, image data, pointer coordinate information, and the like are transmitted to the projector 200 via the PC network I/F 105 under the control of the CPU 101. In the embodiment, image data to be transmitted from the PC 100 to the projector 200 is converted into data of a predetermined format by an image processing unit 108 (to be described later), and then transmitted.

As described above, the mouse 106 is a pointing device in the PC 100 according to the embodiment. By operating the mouse 106, the user can select an object such as an application window displayed on a display unit 110 (to be described later), or change the object position by a drag operation. The embodiment will use and describe the mouse 106 as a pointing device or a user interface for changing the position of an object. However, it will be readily understood that the user interface may be formed from a keyboard, touch panel sensor, or the like in the practice of the present invention.

A VRAM 107 is a video memory used to hold GUIs such as an application window and pointer displayed on the display unit 110 (to be described later), and generate a screen (image data) formed by the GUIs. The image processing unit 108 uses the VRAM 107. The image processing unit 108 is a block which uses the VRAM 107 as a working memory, generates image data in which the above-mentioned GUI data is composited, converts image data into a transmission format, and performs image processes such as enlargement/reduction and encoding. In the embodiment, the VRAM 107 temporarily stores generated or captured image data to be transmitted from the PC 100 to the projector 200.

A display control unit 109 is a block which controls image presentation on the display unit 110 (to be described later). For example, the display control unit 109 applies D/A conversion processing to image data generated by the image processing unit 108, and outputs an obtained analog image signal to the display unit 110. The display unit 110 is a display device such as a liquid crystal monitor, and displays an analog image signal input from the display control unit 109.

Next, the functional arrangement of the projector 200 will be explained.

A control unit 201 is, for example, a CPU, and controls the operation of each block in the projector 200. More specifically, the control unit 201 controls the operation of each block in the projector 200 by, for example, reading out the program of image presentation processing (to be described later) stored in a ROM 202, expanding it in a RAM 203, and executing it.

The ROM 202 is, for example, a rewritable nonvolatile memory, and stores parameters necessary for the operation of each block of the projector 200, control programs describing the processing procedures of the control unit 201, and the like. The RAM 203 is, for example, a volatile memory. The RAM 203 is used as an expansion area for the program of image presentation processing, and also as a work memory in the operation of each block to temporarily store data and control programs output by the operation.

A network I/F 204 is a network interface for communicating with the PC 100 via the wireless network 300. In the embodiment, image data, pointer coordinate information, and the like transmitted from the PC 100 are received via the network I/F 204. In the embodiment, a projection control unit 206 (to be described later) expands data which has been received from the PC 100 and has a predetermined format obtained by converting image data.

A user I/F 205 includes a user interface such as a power button arranged in the projector 200, and a user interface such as an infrared receiving unit for receiving a remote control signal transmitted by operating a remote controller by the user. The user I/F 205 detects a signal input by a user operation, and transmits a control signal corresponding to the operation to the control unit 201.

The projection control unit 206 is a block which controls a projection unit 207 (to be described later). The projection control unit 206 rasterizes image data to be displayed, outputs it to the projection unit 207, and renders a pointer GUI on the image data at a position corresponding to received pointer coordinate information. The projection unit 207 includes a light source, a liquid crystal panel, a lens, and a driving system for the lens (none of them are shown). Image data input to the projection unit 207 is rendered on the liquid crystal panel, and projected onto the imaging plane of the lens by the light source.

<Image Transmission Processing>

Image transmission processing in the PC 100 having the above arrangement according to the embodiment will be explained in detail with reference to the flowchart of FIG. 3. Processing corresponding to this flowchart can be implemented by, for example, reading out a corresponding processing program stored in the PC-ROM 102, expanding it in the PC-RAM 103, and executing it by the CPU 101. In the following description, the image transmission processing starts when, for example, the user inputs an instruction to project, on the projector 200, a screen displayed on the display unit 110 of the PC 100, and a communication connection between the PC 100 and the projector 200 is established. Note that the image transmission processing is repetitively executed until the user inputs an instruction to stop the projection.

The image transmission processing will be described using a case in which the user drags a currently rendered object. However, it will be understood that the practice of the present invention is not limited to this. That is, whether a currently rendered object has changed between successive image data among image data sequentially transmitted to the projector 200 may be determined based on execution/non-execution of a scroll operation, object enlargement/reduction operation, or the like.

In step S301, the CPU 101 determines whether the user has dragged a currently rendered object such as an application window. More specifically, the CPU 101 analyzes time-series control signals input from the mouse 106 to the CPU 101, and determines whether the user has dragged the object. If the CPU 101 determines that the user has dragged the currently rendered object, it shifts the process to step S303; if it determines that the user has not dragged the currently rendered object, to step S302.

When, for example, the pointer has not moved for a predetermined time or longer while the drag operation remains executed, it is considered that the object has not changed in time-series image data, so the CPU 101 may shift the process to step S302.

In step S302, the CPU 101 acquires, from the VRAM 107, image data of the full screen to be displayed on the display unit 110. Image data of the full screen is acquired because, even if a display delay occurs in the projector 200, the display delay is considered to hardly affect the quality of an image projected on the projector 200.

If the CPU 101 determines in step S301 that the drag operation has been performed, image data needs to be transmitted not to generate a display delay in the projector 200. Thus, the CPU 101 executes processes in steps S303 to S305 to acquire transmission image data.

In step S303, the CPU 101 acquires background image data from the VRAM 107. The background image data is image data contained in a region obtained by excluding the region of an object (moving target object) to be moved by the current drag operation from the region of the full screen. In step S304, the CPU 101 acquires image data of the region of the moving target object from the VRAM 107.

Figure 4A:
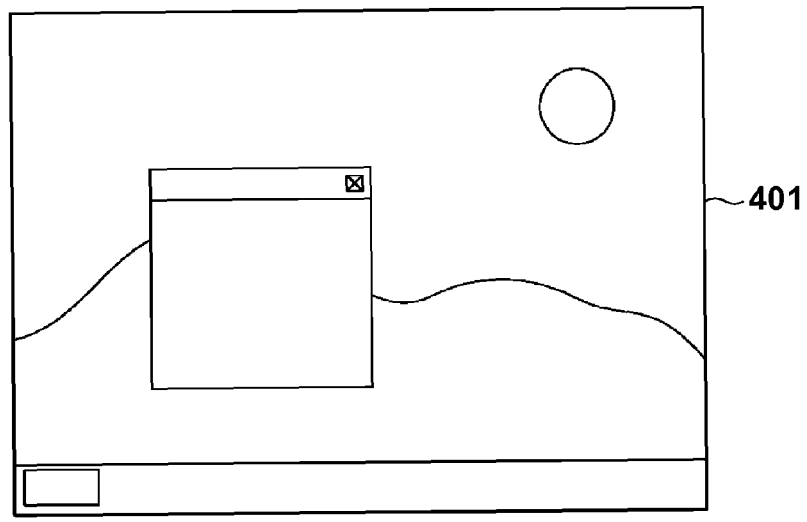
FIGS. 4A, 4B, and 4C are views for explaining image data transmitted in the image transmission processing according to the first embodiment of the present invention.
Figure 4B:
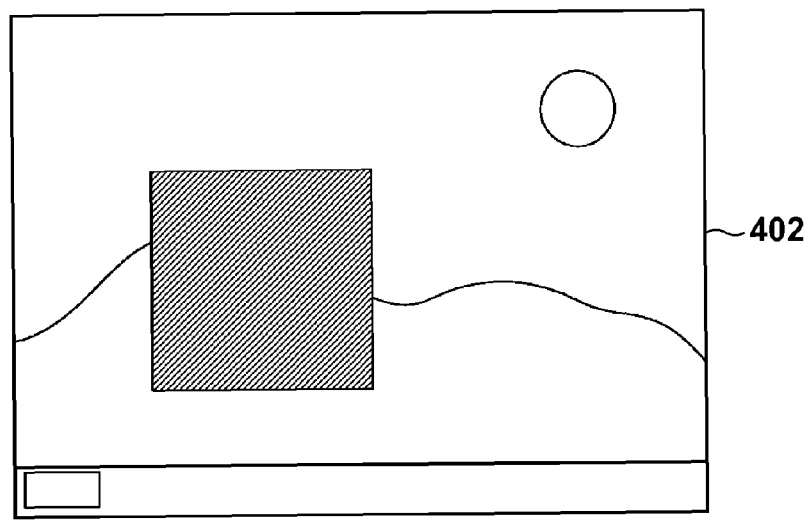
Figure 4C:
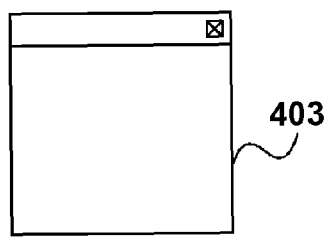

For example, when an image which is currently displayed on the display unit 110 and is to be presented on the projector 200 is formed from an image 401 in FIG. 4A, the image data of the full screen acquired in step S302 is the image 401. The background image data acquired in step S303 is an image 402 in FIG. 4B, and the image data of the moving target object acquired in step S304 is an image 403 in FIG. 4C.

In step S305, the CPU 101 controls the image processing unit 108 to execute reduction processing for the image data of the moving target object acquired in step S304. Then, the CPU 101 creates transmission image data containing the reduced image data of the moving target object and the background image data. At this time, the transmission image data may not contain the pointer. In this case, pointer coordinate information is transmitted together with the transmission image data.

When another object is moved, like the drag operation, image data containing this object needs to be transmitted. However, successively transmitting large quantities of image data generates a transmission delay and display delay, and the projector 200 may not be able to smoothly reproduce the motion of the object. To prevent this, the data quantity of a moving object is decreased in step S305.

Reducing an object may impair the image quality. However, when the moving target object moves, it is considered that the user hardly perceives the image quality and sharpness of the object. It is therefore considered that reducing and transmitting a moving object hardly affects the visibility experienced by the user. By transmitting the thus-generated background image data and image data of the moving target object whose data quantity has been reduced, generation of a transmission delay and display delay can be reduced. When it is determined from a scroll operation, object enlargement/reduction operation, or the like whether a currently rendered object has changed, the data quantity elimination ratio is changed depending on the time-series deformation ratio of the object.

Note that the processing in step S305 aims at eliminating the data quantity of image data of a moving target object. Hence, image processing applied to the image data is not limited to reduction processing by so-called resizing, but may be encoding processing, compression processing, or a combination of them. Since the visibility of a moving target object changes depending on the moving speed of the object, the reduction ratio of reduction processing in this step may be changed in accordance with the dragging speed. More specifically, the CPU 101 may decide the reduction ratio by determining the moving speed of a pointer track input by the operation of the mouse 106, and transmit the reduction ratio to the image processing unit 108 to execute reduction processing. As a moving object moves or changes more, the transmission quantity of image data in one transmission can be reduced more.

In step S306, the CPU 101 controls the image processing unit 108 to convert transmission image data into a format defined in advance between the PC 100 and the projector 200. In step S307, the CPU 101 transmits the converted transmission image data to the projector 200 via the PC network I/F 105, completing the image transmission processing.

By this image transmission processing, even when a change such as movement of an object occurs in an image to be presented on the projector 200, and image data is transmitted at a timing different from a normal image data transmission timing, the transmission quantity in one transmission can be reduced.

<Image Presentation Processing>

Figure 5:
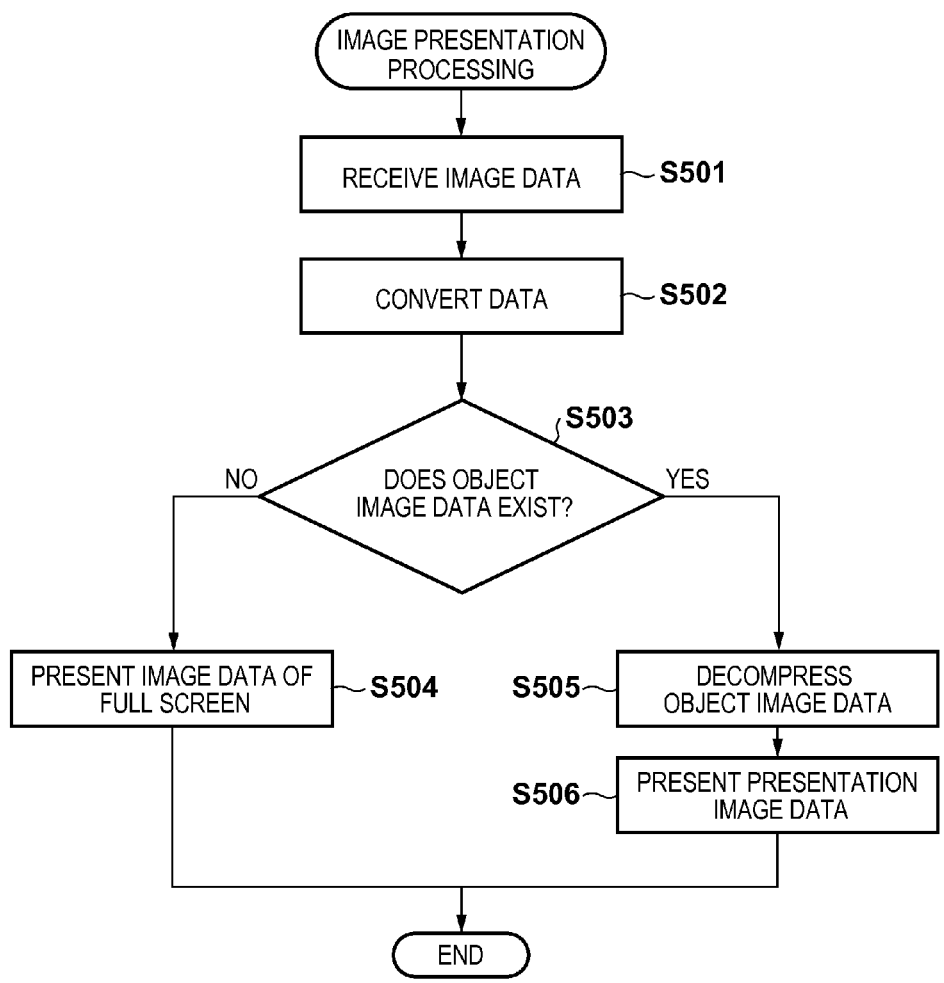
FIG. 5 is a flowchart showing image presentation processing according to the first embodiment of the present invention.

Image presentation processing in the projector 200 to present, on the projection surface by the projection unit 207, image data transmitted from the PC 100 to the projector 200 by the above-described image transmission processing will be explained in detail with reference to the flowchart of FIG. 5. Processing corresponding to this flowchart can be implemented by, for example, reading out a corresponding processing program stored in the ROM 202, expanding it in the RAM 203, and executing it by the control unit 201. In the following description, the image presentation processing starts when, for example, the user inputs an instruction to project, on the projector 200, a screen displayed on the display unit 110 of the PC 100, and a communication connection between the PC 100 and the projector 200 is established. Note that the image presentation processing is repetitively executed until the user operates the PC 100 and inputs an instruction to stop the projection, that is, until transmission of image data is completed.

In step S501, the control unit 201 receives image data transmitted from the PC 100 via the network I/F 204, and stores the received image data in the RAM 203. In step S502, the control unit 201 controls the projection control unit 206 to convert, in the RAM 203, the image data received from the PC 100 into image data of a format presentable by the projection unit 207.

In step S503, the control unit 201 determines whether the image data expanded in the RAM 203 contains image data of a reduced moving target object. That is, the control unit 201 determines whether the image data is image data which has been transmitted when the user dragged the object in the PC 100. If the control unit 201 determines that the image data expanded in the RAM 203 contains image data of a reduced moving target object, it shifts the process to step S505; if it determines that the image data does not contain image data of a reduced moving target object, to step S504. Containing image data of a moving target object means that both object image data and background image data have been received.

In step S504, the control unit 201 superimposes a pointer GUI at a position corresponding to pointer coordinate information received together, and transmits the resultant image data to the projection control unit 206. In this step, the image data expanded in the RAM 203 is image data of the full screen. Thus, the control unit 201 controls the projection control unit 206 to present the image using the projection unit 207, completing the image presentation processing. Note that the pointer GUI is received together with pointer coordinate information received for the first time after establishing a communication connection, and is stored in the RAM 203.

In step S505, the control unit 201 executes decompression processing for the image data of the reduced moving target object that has been expanded in the RAM 203, restoring the image data of the reduced moving target object into image data of the moving target object having a size before reduction. Note that information about the reduction ratio of reduction processing applied in the PC 100, the size of image data before reduction, and the like is contained in, for example, header information of image data of the reduced moving target object. In this step, the projection control unit 206 performs decompression processing based on the information. When the PC 100 performs processing other than reduction processing to decrease the data quantity of image data of the moving target object, processing opposite to this processing is executed to acquire image data corresponding to image data of the moving target object before the processing.

In step S506, the control unit 201 superimposes, on the background image data received together, the image data of the moving target object having the size before reduction that has been obtained in step S505, thereby generating presentation image data. Further, the control unit 201 superimposes a pointer GUI at a position corresponding to the pointer coordinate information received simultaneously, and transmits the resultant image data to the projection control unit 206 to present the image using the projection unit 207, completing the image presentation processing. Note that presentation data may be separately generated without superimposition, then superimposed sequentially, and presented.

In the embodiment, the above-described processing is performed to decrease the transmission quantity of image data in one transmission. However, the present invention is practiced not only for image data, but may be applied to, for example, transmission of another GUI data or the like.

As described above, when an object is moving, the PC 100 according to the embodiment reduces the data quantity and transmits the object image to the projector 200 while transmitting the background image without reducing it. This can reduce degradation in the operational feeling experienced by the user while minimizing the influence on the quality of an image presented by the projector 200.

[Modification]

The first embodiment has described the method of eliminating the transmission quantity of image data in one transmission by eliminating the data quantity of image data of a moving target object. This modification will explain a method of further reducing generation of an image transmission delay by further eliminating the data quantity of background image data.

<Image Transmission Processing>

Figure 6:
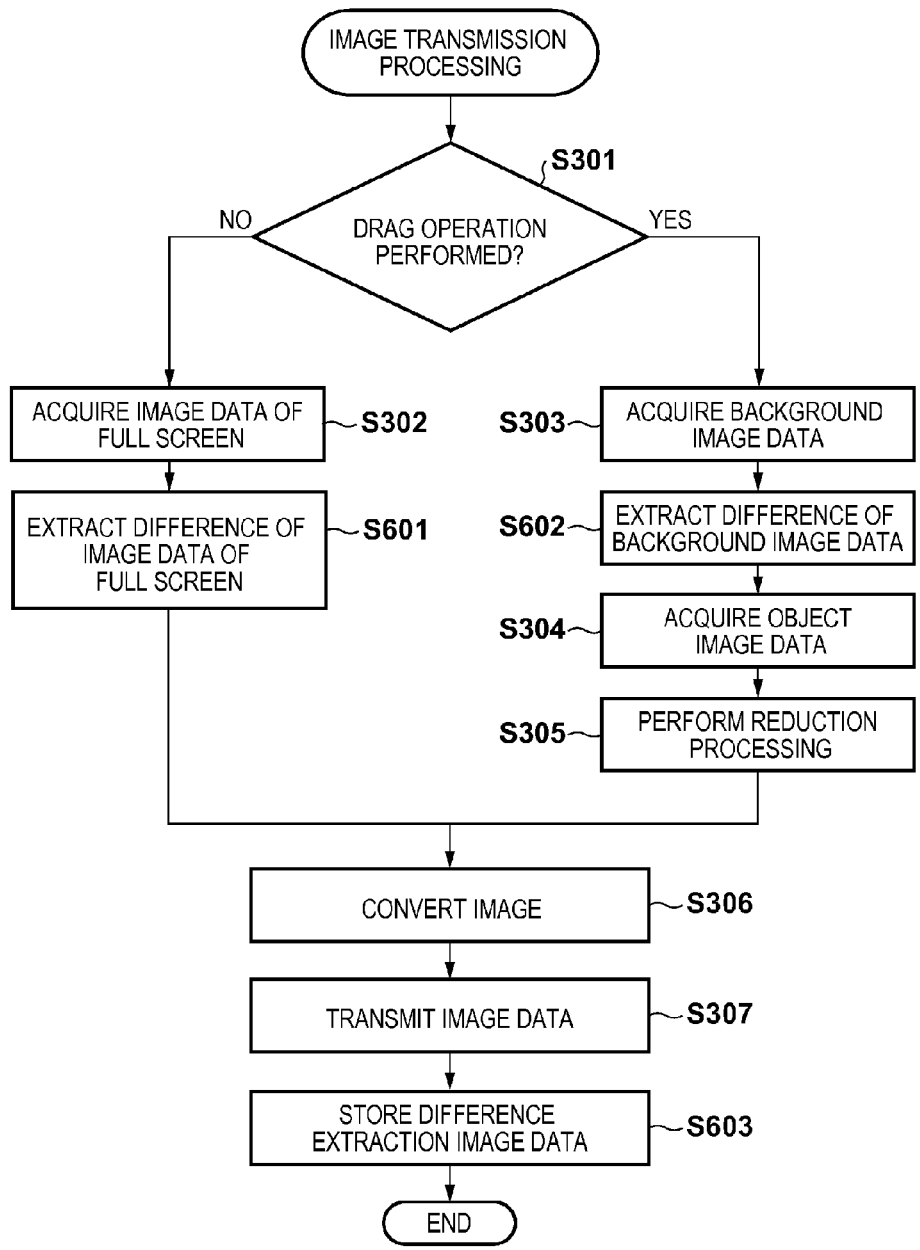
FIG. 6 is a flowchart showing image transmission processing according to a modification of the present invention.

Image transmission processing in the PC 100 of the modification having the same arrangement as that in the first embodiment will be explained in detail with reference to the flowchart of FIG. 6. Processing corresponding to this flowchart can be implemented by, for example, reading out a corresponding processing program stored in the PC-ROM 102, expanding it in the PC-RAM 103, and executing it by the CPU 101. In the following description, the image transmission processing starts when, for example, the user inputs an instruction to project, on the projector 200, a screen displayed on the display unit 110 of the PC 100, and a communication connection between the PC 100 and the projector 200 is established.

In the description of the image transmission processing, the same reference numerals as those in the above-described image transmission processing of the first embodiment denote steps of performing the same processes, and a description thereof will not be repeated. Only steps of performing characteristic processes in the modification will be explained below.

If the CPU 101 determines in step S301 that the no drag operation has not been performed, it acquires image data of the full screen from the VRAM 107 in step S302, and shifts the process to step S601. In step S601, when the PC-RAM 103 stores image data of the full screen acquired in previous transmission of image data to the projector 200, the CPU 101 extracts a difference between this image data and the image data of the full screen acquired in step S302.

If the CPU 101 determines in step S301 that a drag operation has been performed, it acquires background image data from the VRAM 107 in step S303, and shifts the process to step S602. In step S602, when the PC-RAM 103 stores background image data acquired in previous transmission of image data to the projector 200, the CPU 101 extracts a difference between this background image data and the background image data acquired in step S303.

In this manner, in the image transmission processing of the modification, image data of the full screen or background image data acquired in transmission of image data to the projector 200 is stored. For the image data of the full screen or the background image data, a difference from image data acquired in previous transmission of image data to the projector 200 is extracted and transmitted. This can further decrease the data quantity of image data to be transmitted.

Figure 7:
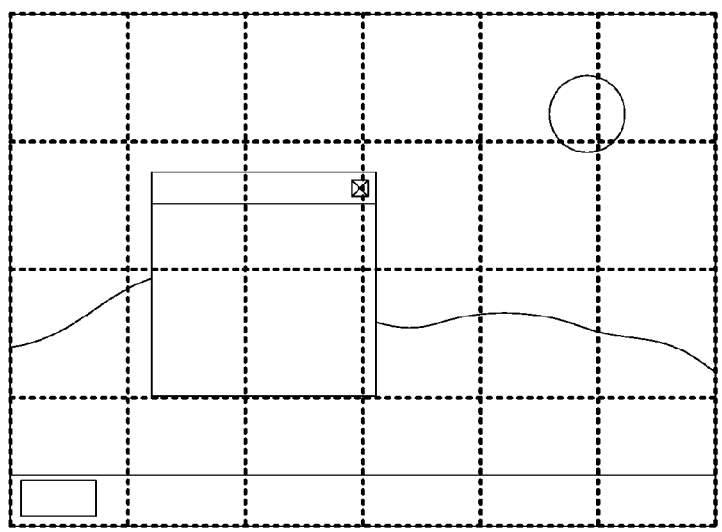
FIG. 7 is a view for explaining image data difference extraction processing according to the modification of the present invention.

More specifically, as for image data of the full screen, the CPU 101 divides each image data into a plurality of blocks each having a predetermined size, as shown in FIG. 7. The CPU 101 determines whether each block has a difference. If each block has a difference, the CPU 101 extracts data of the block as transmission image data.

Figure 8A:
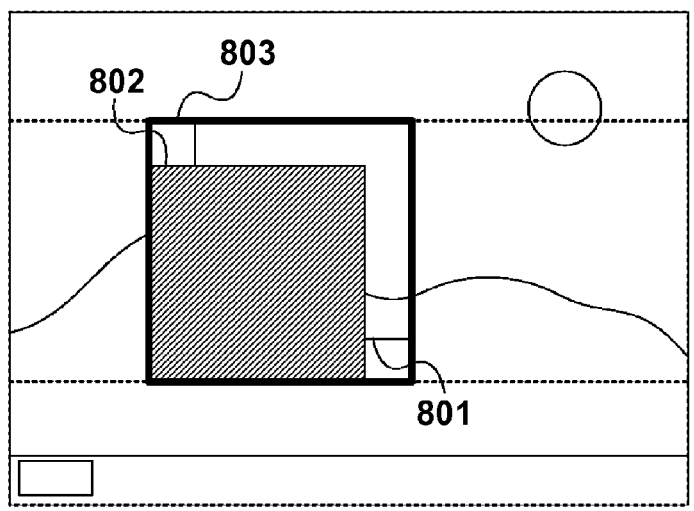
FIGS. 8A and 8B are views for explaining another image data difference extraction processing according to the modification of the present invention.

As for background image data, the CPU 101 transmits the image data at a timing different from a normal image data transmission timing. Thus, the number of blocks to undergo difference extraction processing is decreased as shown in FIG. 8A, thereby shortening the processing time taken for difference extraction. In the example of FIG. 8A, a region containing a previous moving target object 801 and current moving target object 802 is set to form one block 803, and the remaining blocks are set using this block as a reference. That is, when a drag operation is performed, a change is highly likely to occur in only a region where the moving target object exists or a region where the moving target object existed just before the drag operation. For this reason, a region where a change has obviously occurred, that is, a region where the moving target object exists before and after movement is defined as one block. Difference extraction processing can therefore be omitted for this block, and is performed for only the remaining blocks in step S602.

Figure 8B:
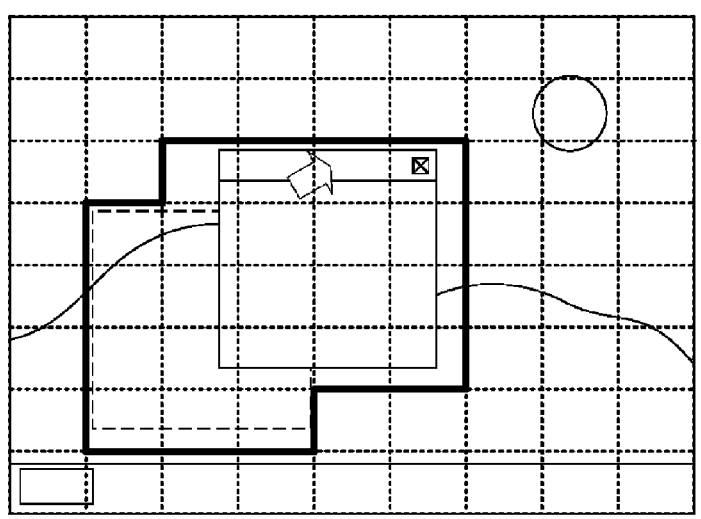

Note that the block classification method need not always be changed in the above way. For example, in division into a plurality of blocks each having a predetermined size, as shown in FIG. 7, it suffices to perform difference extraction for all blocks, and transmit only a block having a difference, as shown in FIG. 8B.

When difference extraction processing is executed for the first time after establishment of a communication connection, completion of a drag operation, or the start of a drag operation, there is no previously transmitted image data of the full screen. In this case, the process shifts to the next step without executing the processing in step S601 or S602.

In step S307, the CPU 101 transmits, to the projector 200, converted transmission image data containing the image data difference extracted in step S601 or S602, and shifts the process to step S603. In step S603, the CPU 101 stores, in the PC-RAM 103, the image data which has been obtained by extracting difference image data and transmitted in step S307, that is, the image data acquired in step S302 or S303, completing the image transmission processing. The image data stored in the PC-RAM 103 in this step serves as image data acquired in previous transmission of image data. This image data is compared for difference extraction in step S601 or S602 when the image transmission processing is performed repetitively.

As described above, the image transmission processing according to the modification can reduce the transmission quantity of image data in one transmission not only when a change such as movement of an object occurs in an image to be presented on the projector 200, but also in another case.

Second Embodiment

The first embodiment and modification described above have explained the method of avoiding generation of a display delay by reducing the transmission quantity in one transmission when an operation which may generate an image transmission delay is performed. However, the method of transmitting image data and transmitting only coordinate information for a pointer has the following problem when a transmission/display delay occurs in image data transmission. More specifically, if a transmission/display delay occurs in image data transmission, the projector may display coordinate information having a small data quantity first, and display image data later. Hence, matching between movement of the pointer and that of the object may not be held. In this case, movement of the pointer to a target position is presented, and then movement of the dragged object is presented, as shown in FIG. 9. This may give an unnatural impression to the user.

The second embodiment will explain a method capable of presenting image data holding at least matching between movement of an object and that of a pointer, thereby improving the operational feeling experienced by the user. Note that the apparatus arrangement of an image transmission/presentation system according to the second embodiment, and the functional arrangements of respective apparatuses in the system are the same as those in the first embodiment and modification, so a description thereof will not be repeated.

<Presentation Information Transmission Processing>

Presentation information transmission processing in a PC 100 according to the second embodiment will be explained in detail with reference to the flowchart of FIG. 10. Processing corresponding to this flowchart can be implemented by, for example, reading out a corresponding processing program stored in a PC-ROM 102, expanding it in a PC-RAM 103, and executing it by a CPU 101. In the following description, the presentation information transmission processing starts when, for example, the user inputs an instruction to project, on a projector 200, a screen displayed on a display unit 110 of the PC 100.

In step S1001, the CPU 101 establishes a communication connection so that the PC 100 can communicate with the projector 200 via a PC network I/F 105 and wireless network 300. After the communication connection is established, the CPU 101 acquires pointer GUI data held in a VRAM 107, and transmits the GUI data to the projector 200 via the PC network I/F 105 in step S1002. That is, in step S1002, image data need not be transmitted every time the pointer position changes. Instead, after a communication connection is established, pointer GUI data used for rendering is transmitted so that the projector 200 can perform pointer rendering processing. Note that the pointer GUI data may be formed from a plurality pieces of GUI data different for respective pointer states. Alternatively, when one piece of GUI data represents animation, single piece of GUI data may contain a plurality of GUI images. When pointer GUI data contains a plurality of GUI images, each GUI image is managed by an ID, and the ID is transmitted to instruct the projector 200 about a GUI image to be rendered.

In step S1003, the CPU 101 parallelly executes processing (pointer-related information transmission processing) of transmitting information related to the pointer (pointer-related information), and processing (image transmission processing) of transmitting image data. For this purpose, the CPU 101 creates threads regarding these two processes. Then, the CPU 101 starts the processes of the created multiple threads.

In step S1004, the CPU 101 determines whether the user has input an instruction to end the projection. If the CPU 101 determines that the user has input an instruction to end the projection, it shifts the process to step S1005; if it determines that the user has not input such this instruction, repeats the processing in this step until the user inputs this instruction. In the embodiment, by determining in this step whether the user has input an instruction to end the projection, the CPU 101 decides whether to stop the transmission of information. However, the practice of the present invention is not limited to this. For example, upon receiving a disconnection instruction from the projector 200, the CPU 101 may decide to stop the transmission of information.

In step S1005, the CPU 101 ends the threads of the pointer-related information transmission processing and image transmission processing which have started in step S1003. After that, the CPU 101 cancels the communication connection with the projector 200, completing the presentation information transmission processing.

(Pointer-Related Information Transmission Processing)

The pointer-related information transmission processing out of the threads which have started in step S1003 will be explained in detail below with reference to the flowchart of FIG. 11. Processing corresponding to this flowchart can be implemented by, for example, reading out a corresponding processing program stored in the PC-ROM 102, expanding it in the PC-RAM 103, and executing it by the CPU 101.

In step S1101, the CPU 101 determines whether the user has dragged a currently rendered object. More specifically, the CPU 101 analyzes time-series control signals input from a mouse 106 to the CPU 101, and determines whether the user has dragged the object. If the CPU 101 determines that the user has dragged the currently rendered object, it shifts the process to step S1102; if it determines that the user has not dragged the currently rendered object, to step S1103.

In step S1102, the CPU 101 acquires pointer-related information using an OS function, and transmits the information to the projector 200 via the PC network I/F 105. The pointer-related information contains, for example, an ID for identifying GUI data (image) of a pointer to be rendered, in addition to the above-described pointer coordinate information.

In step S1103, the CPU 101 determines whether it has received an instruction to stop the transmission of the pointer-related information. In this description, the CPU 101 transmits the instruction to end the thread in step S1005 of the presentation information transmission processing. However, this instruction may be input by the user or received by the projector 200, a communication connection with which has been established. If the CPU 101 determines that it has received a pointer-related information transmission stop instruction, it completes the pointer-related information transmission processing. If the CPU 101 determines that it has not received a pointer-related information transmission stop instruction, it returns the process to step S1101.

In the pointer-related information transmission processing, whether pointer-related information has been transmitted is determined from whether a drag operation has been performed. When an operation such as a drag operation which may generate an image transmission delay is performed, if image data and pointer-related information are transmitted separately, movement of the object and that of the pointer may not be synchronized due to the transmission delay. In the pointer-related information transmission processing, therefore, when an operation which may generate an image transmission delay is performed, it is controlled not to separately transmit image data and pointer-related information in order to maintain at least matching between movement of the object and that of the pointer.

(Image Transmission Processing)

Figure 12:
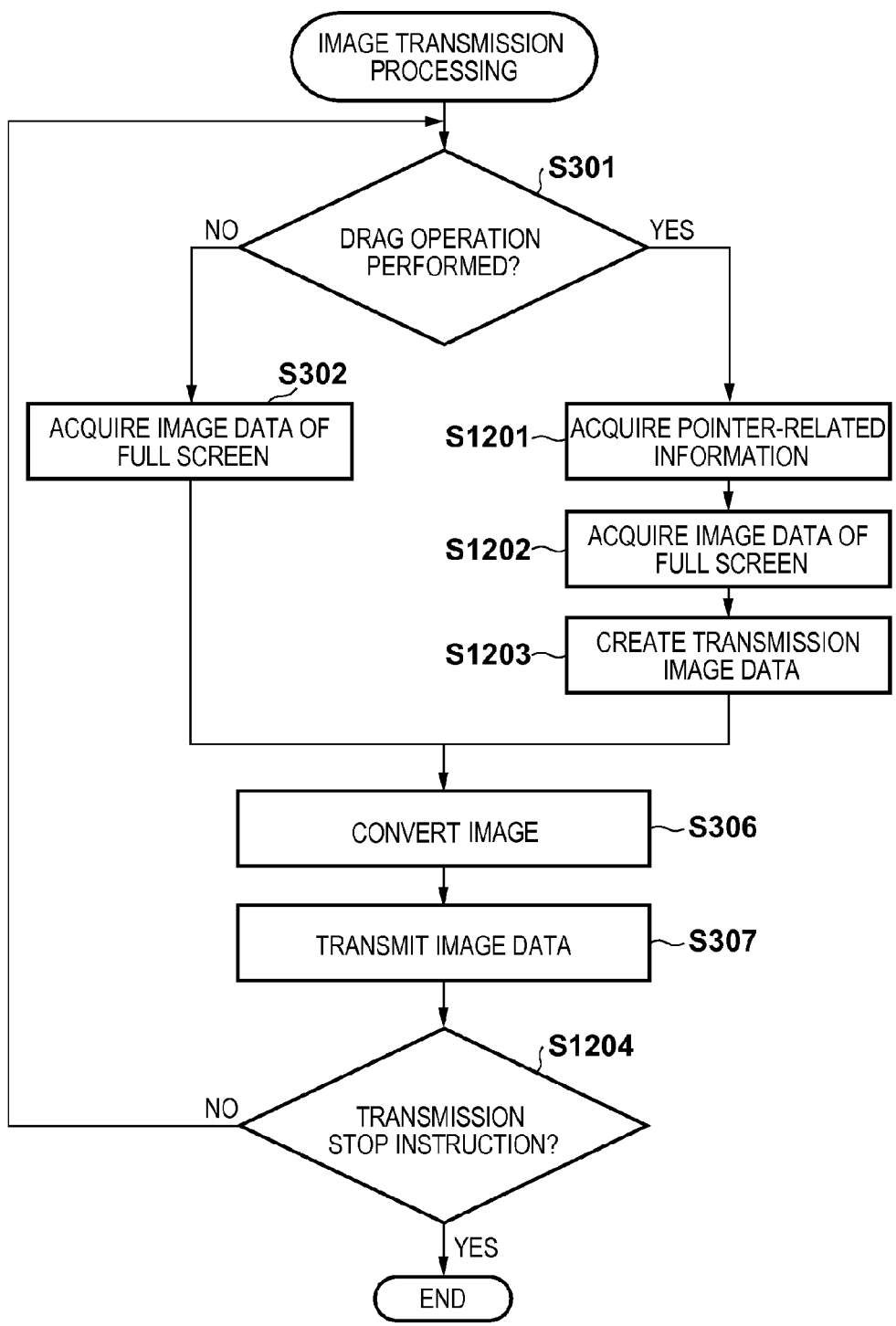
FIG. 12 is a flowchart showing image transmission processing according to the second embodiment of the present invention.

The image transmission processing out of the threads which have started in step S1003 will be explained in detail below with reference to the flowchart of FIG. 12. Processing corresponding to this flowchart can be implemented by, for example, reading out a corresponding processing program stored in the PC-ROM 102, expanding it in the PC-RAM 103, and executing it by the CPU 101. In the description of the image transmission processing according to the second embodiment, the same reference numerals as those in the above-described image transmission processing of the first embodiment or modification denote steps of performing the same processes, and a description thereof will not be repeated. Only steps of performing characteristic processes in the second embodiment will be explained below.

If the CPU 101 determines in step S301 that a drag operation has been performed, it acquires pointer-related information using an OS function in step S1201. In step S1202, the CPU 101 acquires, from the VRAM 107, image data of the full screen to be displayed on the display unit 110.

As described above, when an operation which may generate an image transmission delay is performed, if image data and pointer-related information are transmitted separately to the projector 200, matching between movement of an object and that of a pointer may not be maintained due to the transmission/display delay. To prevent this, in the second embodiment, when an operation which may generate an image transmission delay is performed, the PC 100 acquires pointer-related information and image data at the same timing or in a period within which timings are regarded to be the same. By transmitting at once the acquired pointer-related information and image data to the projector 200 in the image transmission processing, at least matching between movement of the object and that of the pointer can be maintained even if a transmission delay occurs. Thus, the processes in steps S1201 and S1202 are executed successively at the same timing or in a period within which timings are regarded to be the same. In step S1203, the CPU 101 creates transmission image data by adding the pointer-related information acquired in step S1201 to the image data of the full screen acquired in step S1202.

After transmitting the transmission image data to the projector 200 in step S307, the CPU 101 determines in step S1204 whether it has received an instruction to stop the transmission of the transmission image data. In this description, the CPU 101 transmits the instruction to end the thread in step S1005 of the presentation information transmission processing. However, this instruction may be input by the user or received by the projector 200, a communication connection with which has been established. If the CPU 101 determines that it has received a transmission image data transmission stop instruction, it completes the image transmission processing. If the CPU 101 determines that it has not received a transmission image data transmission stop instruction, it returns the process to step S301.

<Image Presentation Processing>

Figure 13:
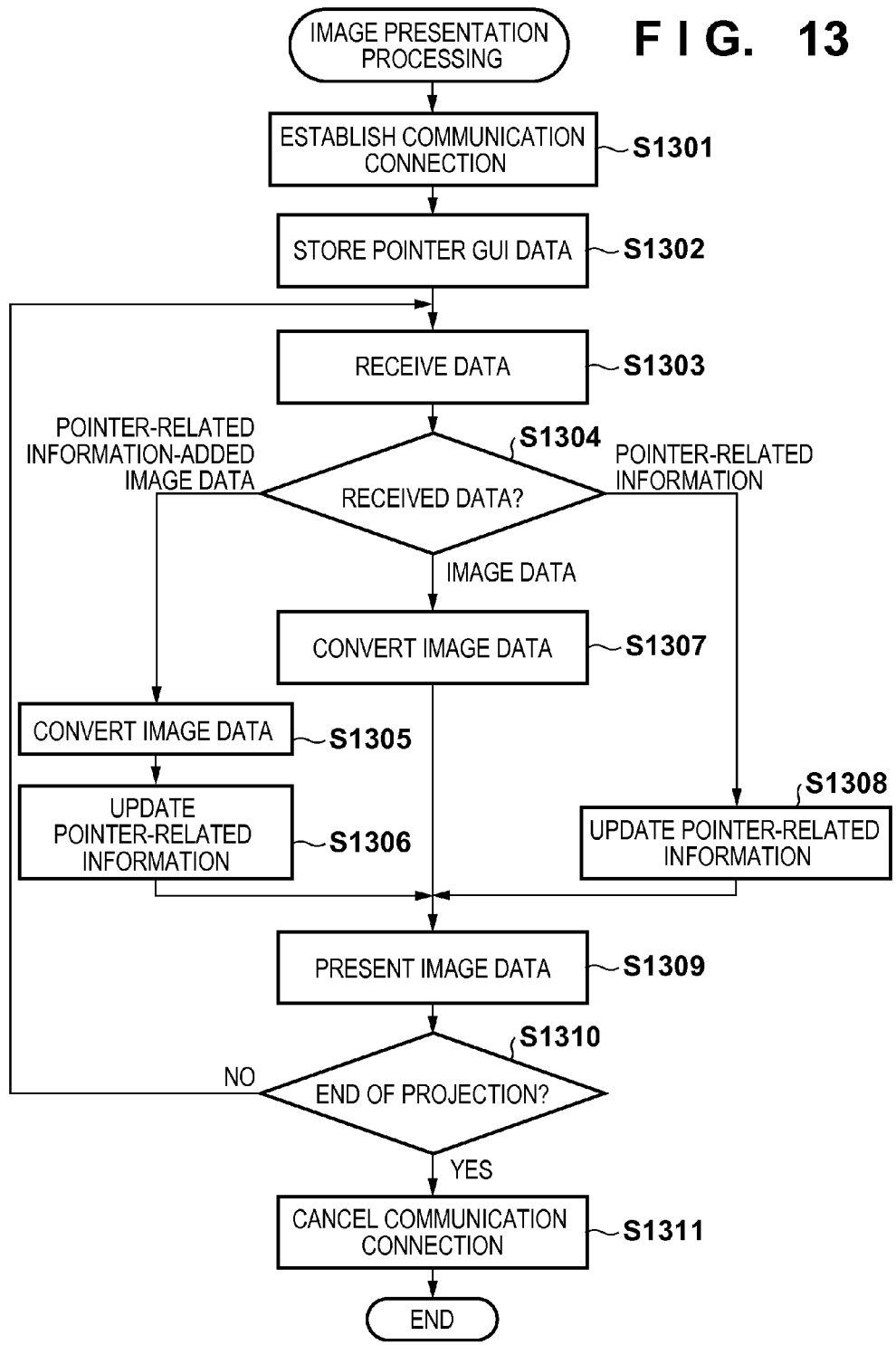
FIG. 13 is a flowchart showing image presentation processing according to the second embodiment of the present invention.

Next, image presentation processing in the projector 200 to present an image on the projection surface using image data and pointer-related information which have been transmitted from the PC 100 to the projector 200 in the above-described presentation information transmission processing will be explained in detail with reference to the flowchart of FIG. 13. Processing corresponding to this flowchart can be implemented by, for example, reading out a corresponding processing program stored in a ROM 202, expanding it in a RAM 203, and executing it by a control unit 201. In the following description, the image presentation processing starts when, for example, the user inputs an instruction to project, on the projector 200, a screen displayed on the display unit 110 of the PC 100, and the projector 200 receives a communication connection request from the PC 100.

In step S1301, the control unit 201 executes predetermined processing in response to a communication connection request from the PC 100, and establishes a communication connection between the PC 100 and the projector 200 via a network I/F 204. In step S1302, the control unit 201 receives, from the PC 100 via the network I/F 204, GUI data of a pointer to be rendered on a presented image, and stores the received GUI data in the RAM 203.

In step S1303, the control unit 201 receives data transmitted from the PC 100 via the network I/F 204, and stores the received data in the RAM 203. In step S1304, the control unit 201 determines which of "pointer-related information-added image data", "image data", and "pointer-related information" is the received data. If the control unit 201 determines that the received data is "pointer-related information-added image data", it shifts the process to step S1305; if it determines that the received data is "image data", to step S1307; if it determines that the received data is "pointer-related information", to step S1308.

In step S1305, the control unit 201 separates the pointer-related information from the received data. Also, the control unit 201 controls a projection control unit 206 to convert, in the RAM 203, the remaining image data into image data of a format presentable by a projection unit 207. In step S1306, the control unit 201 uses the separated pointer-related information to update information which is stored as the current pointer-related information in the RAM 203.

In step S1307, the control unit 201 controls the projection control unit 206 to convert, in the RAM 203, the image data received from the PC 100 into image data of a format presentable by the projection unit 207. In step S1308, the control unit 201 uses pointer-related information received from the PC 100 to update the current pointer-related information stored in the RAM 203.

In step S1309, the control unit 201 superimposes a pointer GUI at a corresponding position in accordance with the current pointer-related information in the image data of the presentable format stored in the RAM 203. The control unit 201 transmits the resultant image data to the projection control unit 206. The control unit 201 controls the projection control unit 206 to present the image using the projection unit 207, and then shifts the process to step S1310.

In step S1310, the control unit 201 determines whether the user has input an instruction via the PC 100 or directly to end the projection. If the control unit 201 determines that the user has input an instruction to end the projection, it shifts the process to step S1311; if it determines that the user has not input such an instruction, returns the process to step S1303.

In step S1311, the control unit 201 cancels the current communication connection with the PC 100 via the network I/F 204, completing the image presentation processing.

In this way, the projector 200 executes the image presentation processing. Even when an operation which may generate an image transmission delay is performed, the projector 200 can present an image in which movement of an object matches that of a pointer.

In the second embodiment, when a drag operation is performed, pointer-related information is transmitted together with image data in image transmission processing. Alternatively, the PC 100 may generate an image in which a pointer image is superimposed on image data of the full screen, and transmit it.

In the second embodiment, when a drag operation is performed, image data and pointer-related information synchronized with each other are transmitted simultaneously. Compared to a case in which no drag operation is performed, the user may feel that the responsiveness of movement of the pointer drops. To solve this, for example, a message notifying the possibility of a decrease in responsiveness may be displayed on an image on the projection surface which presents an image by the display unit 110 or projection unit 207.

The second embodiment provides the arrangement which achieves not reduction of the transmission quantity of image data in one transmission, but presentation of an image in which movement of a pointer matches that of an object. However, the second embodiment can also implement reduction of the transmission quantity by transmitting difference data only when a difference from data acquired in previous transmission of data to the projector 200 is generated, similar to the above-described modification.

As described above, even when a piece of image data transmission/display delay occurs, the information processing apparatus according to the embodiment can present, on the image output apparatus, an image in which movement of a pointer matches that of an object. Degradation in the operational feeling experienced by the user can be reduced.

In this specification, the present invention has been described using the first and second embodiments and the modification, but is not limited to them. For example, the respective embodiments can be properly combined. For example, when an object is dragged, the data quantity of the object may be decreased, and a transmission image may be generated to contain a pointer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-001583, filed Jan. 6, 2012, which is hereby incorporated by reference herein in its entirety.

What is claimed is:

1. An information processing apparatus capable of communicating with an image output apparatus, comprising:
    an acquisition unit configured to acquire pointer position information indicating a position of a pointer in a screen displayed on a display unit of the information processing apparatus;
    a detection unit configured to detect a predetermined operation using the pointer to an object included in the screen, both the object and the pointer are in a state to be displayed together in the screen displayed on the display unit of the information processing apparatus; and
    a transmission control unit configured to control to transmit at least part or screen data corresponding to the screen to the image output apparatus,
    wherein modes of transmission by the transmission control unit include a first transmission mode in which the at least part of the screen data, and the pointer position information acquired by the acquisition unit are transmitted without association and no image of the pointer is transmitted, and a second transmission mode in which the at least part of the screen data to be transmitted and the pointer position information acquired by the acquisition unit are transmitted as information indicating the pointer position corresponding to the pointer which is being displayed on the display unit together with the at least part of the screen data to be transmitted such that at least matching between movement of the object and that of the pointer is maintained, and movement in which the object follows the pointer with delay, occurred by transmission delay, is avoided, and
    wherein in a case that the detection unit detects the predetermined operation, the transmission control unit transmits the at least part of the screen data in the second transmission mode.

2. The apparatus according to claim 1, wherein in a case that the detection unit detects an operation of dragging the object using the pointer, the transmission control unit transmits the at least part of the screen data in the second transmission mode.

3. The apparatus according to claim 1, wherein the object includes a window included in the screen.

4. The apparatus according to claim 1, wherein the pointer position information includes coordinate information indicating a position of the pointer in the screen.

5. The apparatus according to claim 1, wherein in the first transmission mode, the transmission control unit controls to independently transmit the at least part of the screen data and the pointer position information acquired by the acquisition unit.

6. The apparatus according to claim 1, wherein in the second transmission mode, the transmission control unit controls to add the pointer position information acquired by the acquisition unit to the at least part of the screen data and transmit the at least part of the screen data and the pointer position information.

7. The apparatus according to claim 1, wherein the at least part of the screen data and the pointer position information transmitted by the transmission control unit are used in the image output apparatus to superimpose the at least part of the screen data and the pointer on already-output screen data, and output the at least part of the screen data, the pointer, and the already-output screen data.

8. The apparatus according to claim 1, wherein the screen data is transmitted as compressed image data to the image output apparatus.

9. A method of controlling an information processing apparatus capable of communicating with an image output apparatus, comprising:
    acquiring pointer position information indicating a position of a pointer in a screen displayed on a display unit of the information processing apparatus;
    detecting a predetermined operation using the pointer to an object included in the screen, both the object and the pointer are in a state to be displayed together in the screen displayed on the display unit of the information processing apparatus; and
    controlling to transmit at least part of screen data corresponding to the screen to the image output apparatus,
    wherein the transmission includes a first transmission mode in which the at least part of the screen data, and the acquired pointer position information are transmitted without association and no image of the pointer is transmitted, and a second transmission mode in which the at least part of the screen data to be transmitted and the acquired pointer position information are transmitted as information indicating the pointer position corresponding to the pointer which is being displayed on the display unit together with the at least part of the screen data to be transmitted such that at least matching between movement of the object and that of the pointer is maintained, and movement in which the object follows the pointer with delay, occurred by transmission delay, is avoided, and
    wherein in a case that the predetermined operation is detected, the at least part of the screen data is transmitted in the second transmission mode.

10. A non-transitory computer-readable recording medium recording a program for causing a computer to execute a method of controlling an information processing apparatus capable of communicating with an image output apparatus, comprising:
    acquiring pointer position information indicating a position of a pointer in a screen displayed on a display unit of the information processing apparatus;
    detecting a predetermined operation using the pointer to an object included in the screen, both the object and the pointer are in a state to be displayed together in the screen displayed on the display unit of the information processing apparatus; and
    controlling to transmit at least part of screen data corresponding to the screen to the image output apparatus,
    wherein the transmission includes a first transmission mode in which the at least part of the screen data, and the acquired pointer position information are transmitted without association and no image of the pointer is transmitted, and a second transmission mode in which the at least part of the screen data to be transmitted and the acquired pointer position information are transmitted as information indicating the pointer position corresponding to the pointer which is being displayed on the display unit together with the at least part of the screen data to be transmitted such that at least matching between movement of the object and that of the pointer is maintained, and movement in which the object follows the pointer with delay, occurred by transmission delay, is avoided, and
    wherein in a case that the predetermined operation is detected, the at least part of the screen data is transmitted in the second transmission mode.

* * * * *